United States Patent
Bokor et al.

(10) Patent No.: US 6,484,306 B1
(45) Date of Patent: Nov. 19, 2002

(54) MULTI-LEVEL SCANNING METHOD FOR DEFECT INSPECTION

(75) Inventors: Jeffrey Bokor, Oakland, CA (US); Seongtae Jeong, Richmond, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/466,730

(22) Filed: Dec. 17, 1999

(51) Int. Cl.[7] .................. G06F 17/50; G06F 19/00; G06K 9/03; G06K 9/74
(52) U.S. Cl. .................. 716/21; 716/4; 430/5; 378/35; 382/144; 382/149; 700/105; 700/110; 700/120; 700/121
(58) Field of Search .................. 716/1–21; 430/4–5; 378/34–35; 382/144, 145, 149; 700/105, 108–110, 115–121

(56) References Cited

U.S. PATENT DOCUMENTS

| | | | | |
|---|---|---|---|---|
| 4,618,938 A | * | 10/1986 | Sandland et al. | 382/148 |
| 4,760,265 A | * | 7/1988 | Yoshida et al. | 250/491.1 |
| 4,764,969 A | * | 8/1988 | Ohtombe et al. | 382/148 |
| 4,979,223 A | * | 12/1990 | Manns et al. | 382/149 |
| 5,018,212 A | * | 5/1991 | Manns et al. | 382/145 |
| 5,917,332 A | * | 6/1999 | Chen et al. | 324/765 |
| 5,917,933 A | * | 6/1999 | Klicker | 382/149 |
| 6,087,673 A | * | 7/2000 | Shishido et al. | 250/559.45 |
| 6,148,097 A | * | 11/2000 | Nakayama et al. | 382/141 |
| 6,222,935 B1 | * | 4/2001 | Okamoto | 382/149 |
| 6,235,434 B1 | * | 5/2001 | Sweeney et al. | 430/5 |
| 6,269,179 B1 | * | 7/2001 | Vachtsevanos et al. | 382/149 |
| 6,282,309 B1 | * | 8/2001 | Emery | 382/145 |
| 6,330,354 B1 | * | 12/2001 | Companion et al. | 382/150 |
| 6,351,554 B1 | * | 2/2002 | Nakayama et al. | 382/141 |
| 6,381,356 B1 | * | 4/2002 | Murakami et al. | 382/141 |

FOREIGN PATENT DOCUMENTS

| | | | | |
|---|---|---|---|---|
| EP | 563897 A1 | * | 10/1993 | G01N/21/89 |
| JP | 09007521 A | * | 1/1997 | H01J/9/42 |

OTHER PUBLICATIONS

Allan et al., "Efficient critical area algorithms and their application to yield improvement and test strategies", Proceedings of the IEEE International Workshop on Defect and Fault Tolerance in VLSI Systems, Oct. 17, 1994, pp. 88–96.*

(List continued on next page.)

*Primary Examiner*—Vuthe Siek
*Assistant Examiner*—Phallaka Kik
(74) *Attorney, Agent, or Firm*—John P. O'Banion

(57) ABSTRACT

A method for performing scanned defect inspection of a collection of contiguous areas using a specified false-alarm-rate and capture-rate within an inspection system that has characteristic seek times between inspection locations. The multi-stage method involves setting an increased false-alarm-rate for a first stage of scanning, wherein subsequent stages of scanning inspect only the detected areas of probable defects at lowered values for the false-alarm-rate. For scanning inspection operations wherein the seek time and area uncertainty is favorable, the method can substantially increase inspection throughput.

15 Claims, 3 Drawing Sheets

OTHER PUBLICATIONS

Mital et al., "A rule based inspection for printed circuits boards", 1990 IEEE Region 10 Conference on Computer and Communication Systems, vol. 2, Sep. 24, 1990, pp. 746–749.*

Bond et al., "Use of multiple lithography monitors in a defect control strategy for high volume manufacturing", 1999 IEEE/SEMI Advanced Semiconductor Manufacturing Conference and Workshop, Sep. 8, 1999, pp. 265–269.*

Reiser et al., "Estimating component–defect probability from masked system success/failure data", IEEE Transactions on Reliability, vol. 45, No. 2, Jun. 1996, pp. 238–243.*

Le et al., "Adaptive thresholding–a robust fault detection approach", Proceedings of the 36th IEEE Conference on Decision and Control, vol. 5, Dec. 10, 1997, pp. 4490–4495.*

Woo et al., "Automated shadow mask inspection using DSP", IEEE/RSJ International Workshop on Intelligent Robots and Systems, vol. 1, Nov. 3, 1991, pp. 303–306.*

Hess et al., "Modeling of Real Defect Outlines and Parameter Extraction Using a Checkerboard Test Structure to Localize Defects", IEEE Transactions on Semiconductor Manufacturing, vol. 7, No. 3, Aug. 1994, pp. 284–292.*

Xue et al., "Fast multi–layer critical area computation", IEEE International Workshop on Defect and Fault Tolerance VLSI Systems, Oct. 27, 1993, pp. 117–124.*

Hess et al., "Strategy to disentangle multiple faults to identify random defects within test structures", Proceedings of the 1998 International Conference on Microelectronic Test Structures, Mar. 23, 1998, pp. 141–146.*

Singh, "ADTS: an array defect–tolerance scheme for wafer scale gate arrays", Proceedings of 1995 IEEE International Workshop on Defect and Fault Tolerance in VLSI Systems, Nov. 13, 1995, pp. 126–136.*

* cited by examiner

MULTI-LEVEL SCANNING METHOD FOR DEFECT INSPECTION

STATEMENT REGARDING FEDERALLY SPONSORED RESEARCH OR DEVELOPMENT

The United States Government has rights in this invention pursuant to Contract No. DE-AC03-76SF00098 between the United States Department of Energy and the University of California.

CROSS-REFERENCE TO RELATED APPLICATIONS

Not Applicable

REFERENCE TO A MICROFICHE APPENDIX

Not Applicable

BACKGROUND OF THE INVENTION

1. Field of the Invention

This invention pertains generally to integrated circuit fabrication, and more particularly to a scanning method for use in a defect inspection system.

2. Description of the Background Art

During the process of integrated circuit fabrication, masks and wafers at various stages are inspected for defects. The inspection process consists typically of sequentially scanning areas of the mask, or wafer, with a beam of light while taking accurate measurements to detect if a defect exists at each location scanned. The beam is retained at any particular spot on the item under inspection for a period of time related to the accuracy of the measurement required, and the measurement results are compared against a threshold value to determine if the location contains a defect. The measurement accuracy, and thereby the time required to perform the measurement, depends largely on the number of false alarms which are permissible per unit of area when performing the test.

Properties of a defect inspection system include such important metrics as throughput, capture-rate, and false-alarm rate for a defect of a given size. The throughput is the number of units (i.e. mask blanks, or wafer blanks) that can be inspected per unit of time at a specified capture-rate and false-alarm-rate. Throughput is dependent on scanning speed, which is defined as the time to scan a unit area of the mask blank. False-alarm-rate is the probability of a non-defective area being considered defective during the test scan. The capture-rate is the probability that a defect of a given size will be detected by the test scan. Both false-alarm-rate and capture-rate depend on quality of the measurement. Within an inspection system that employs single level scanning, the quality of the measurement can also be considered as the signal-to-noise ratio that should be achieved so that a measurement threshold value can properly distinguish a defect.

To more fully exemplify defect scanning, the scanning of (Extreme UltraViolet Lithography) EUVL mask blanks is described. One form of defect inspection is to inspect reflective EUVL mask blanks using an at-wavelength inspection tool. Reflective masks contain multiple reflective layers whose spacing relates to the intended wavelength to be reflected. Reflective masks therefore can only be accurately tested for subsurface defects if the test is performed with an at-wavelength beam. One form of testing EUVL mask blanks involves scanning the area of the mask with a small diameter EUV beam (approximately 1.7×5 µm) and measuring changes in reflected intensity (bright field detection), scatter intensity (dark field detection), and/or the photoemissive current. In order for small defects to be detected, the size of the incident beam is very small, while the measurement itself must be taken over a large enough interval to assure accuracy. An inspection station used for this testing process typically comprises a mask blank held on a moveable stage within a vacuum chamber operating at about $10^{-6}$ Torr. A small spot of EUV light is created by demagnifying a beam from an illuminating pinhole through a pair of Kirkpatrick-Baez (KB) mirrors. The beam is focused on the sample at approximately 9° off-normal. A channeltron electron multiplier may be used for a bright field detector, while a microchannel plate with a reflective beam aperture for the bright field may be used as a dark field detector. To attain accurate defect inspection by this method the mask is generally inspected as a set of pixels, each about 3×5 µm, wherein each pixel is tested for approximately 50 mS.

A mathematical description of a defect inspection device as a shot-noise limited system can provide further explanations of capture-rate and false-alarm-rate for a defect of a certain size. A shot-noise system is one in which the dominant noise source is a shot-noise due to the finite number of photons detected by the detector. In a shot-noise limited system the distribution of signal can be represented by a Gaussian distribution with a mean m and standard deviation σ.

$$f(x) = \left(\frac{1}{\sqrt{2\pi} \times \sigma}\right) e^{-(x-m)^2/(2\sigma^2)} \quad (1)$$

The signal from the clear region, or the region where there is no defect, can therefore be represented by a Gaussian distribution centered at $m_2$, furthermore a signal from a 100 nm defect provides another Gaussian distribution centered at $m_1$. Assuming simple area scaling of signal strength from a defect, and the spot size of 1 um, $m_1=0.99\,m_2$. Simplified for $m_2=1$, then $m_1=0.99$. The standard deviation σ, is determined by the number of photons detected per pixel, wherein the area of each pixel is assumed to be the same as the spot size. The following relationship then holds for σ.

$$\sigma = 1/Nd \quad (2)$$

The value Nd is the number of photons detected per pixel. Based on these assumptions, the capture-rate is determined by the probability of a 100 nm defect generating a signal smaller than threshold value s. A defect herein is assumed to cause a reduction of bright field signal such that the measured signal is smaller than the threshold.

$$\text{capture\_rate} = P(x<s; m_1, \sigma) \quad (3)$$

False-alarm rate is the probability of the clear region giving a signal smaller than the threshold value.

$$\text{false\_alarm\_rate} = P(x<s; m_2, \sigma) \quad (4)$$

As described above, the false-alarm-rate is the probability P of the signal (or pixel value) being lower than a threshold value s, when the distribution is characterized by mean $m_2$ and standard deviation σ. FIG. 1 shows a distribution corresponding to $m_1$, and a second distribution corresponding to $m_2$, both of which are shown in relation to the threshold value s.

Using the error function erf(x), the capture and false-alarm rates can be cast into a form which is an integration of the Gaussian distribution. The error function erf(x) is given by:

$$erf(x) = \frac{2 \times \int_0^x e^{-t^2}}{\sqrt{\pi}} \quad (5)$$

$$P(x < s; m_1, \sigma) = \int_s^\infty f(t) \quad (6)$$

where f(t) is the normalized Gaussian distribution. The integration variable is changed and the following is therefore derived:

$$P(x < s; m_1, \sigma) = \frac{1 + erf\left(\frac{s - m_1}{\sqrt{2}\sigma}\right)}{2} \quad (7)$$

The capture-rate and false-alarm-rate can therefore be expressed as:

$$\text{capture\_rate}(s, \sigma) = \frac{1 + erf\left(\frac{s - 0.99}{\sqrt{2} \times \sigma}\right)}{2} \quad (8)$$

$$\text{false\_alarm\_rate}(s, \sigma) = \frac{1 + erf\left(\frac{s - 1}{\sqrt{2} \times \sigma}\right)}{2} \quad (9)$$

The scanning time required per unit area is given by:

$$T/A = (\text{dwell time per pixel}) \times (\text{no. of pixels per unit area}) \quad (10)$$
$$= Nd/F_0 \times Np = Np/(F_0 \times \sigma^2)$$

where $F_0$ is the total number of photons focused onto the 1 $\mu$m spot per unit time, while Np is the total number if pixels per unit area (Np=$10^8$ per cm$^2$ for 1 $\mu$m spot size). Therefore, for any given spot size, minimum capture-rate, and maximum false-alarm-rate, the scanning time is mainly determined by the standard deviation of the Gaussian distribution of the signal.

As an example, when the signal to noise ratio is at 2 (i.e. $\sigma$=0.5%) and the threshold is set at 0.99, the capture-rate is 50% and the false-alarm-rate is 2.28% with the false-alarm count being 2.28e6 per cm$^2$. The scanning time for $F_0$=1.4e8 is therefore approximately 8 hours per cm$^2$. The value $F_0$=1.4e8 is one that has been achieved using a 10× Schwarzchild with a 100 $\mu$m$^2$ aperture with 100 $\mu$m exit slit with a grating. Using white light with a 20× Schwarzchild, the number increases about 4*50=200. The factor of 50 results from the expected flux increase anticipated from using the white light approach. Therefore it appears that at least $F_0$=2.8e10 can be achieved.

As a further example, if we wish to obtain a capture-rate of 90% and a false-alarm-rate less than 1 count per cm$^2$, the value of s would need to be set for s=0.9916 and $\sigma$=0.15%, with a scanning time of 95 hours per cm$^2$ for $F_0$=2.8e10. Since the false-alarm-rate is so sensitive to $\sigma$ while the scanning time is only the inverse square of $\sigma$, the false-alarm-rate can be lowered without sacrificing too much of the scanning time.

Inspection of mask blanks and wafers in the above described single stage process has been shown above to often be a slow, and therefore costly, process.

Accordingly a new method is needed that will speed the process of inspecting blank masks and wafers for defects.

The present invention satisfies that need, as well as others, and overcomes deficiencies in current inspection techniques.

BRIEF SUMMARY OF THE INVENTION

The present invention is a multi-level scanning method that can increase throughput when used with defect inspection systems, such as the one described for inspecting reflective EUVL mask blanks. The use of multiple scanning stages under many circumstances, although counterintuitive, can provide additional throughput in relation to single stage scanning.

Conventional defect scanning techniques teach the use of a single scan in which measurements are taken at a signal to noise ratio adequate for determining which pixels are clear of defects. The measurements are taken to a level of measurement accuracy that will generate a rate of false-alarms below a given threshold. In a single scan, the number of false alarms resulting by the end of the scan should be less than the desired false-alarm-rate upon which the signal to noise of the measurement was based for the device being tested. In contrast, the present invention provides a multiple scanning approach that can increase throughput. By way of example, and not of limitation, a first stage of scanning employs a lower signal to noise ratio (more false alarm errors), such that the entire area can be inspected in a fraction of the time required to reach the desired false-alarm-rate in a single stage of scanning. Subsequent stages of defect inspection check only those areas failing the defect threshold comparison in the previous inspection stage, and the positionally uncertain areas around these probable defects, with a measurement that provides a higher signal to noise ratio corresponding to a lower false alarm rate. In the final stage of subsequent scanning, the areas which have been found as defects within the prior stage are tested at the final signal to noise ratio corresponding to a final allowed false alarm rate. The benefit of the method depends on the comparative times required to reach the various false-alarm-thresholds, the repeatability of the scanning system, and the speed of the scanning system to seek defect areas. This multi-level inspection method provides the same results as single-level testing, yet it can in many cases be performed in less time than that required for the single-level measurement. In other words, since progressively smaller regions are scanned within each stage, the overall throughput of defect inspection can be increased in situations where a favorable relationship exists between the inspection variables.

An object of the invention is to increase the throughput of defect inspection systems.

Another object of the invention is to retain precise control of the false-alarm-rate allowed by the defect inspection process.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Figure 1:
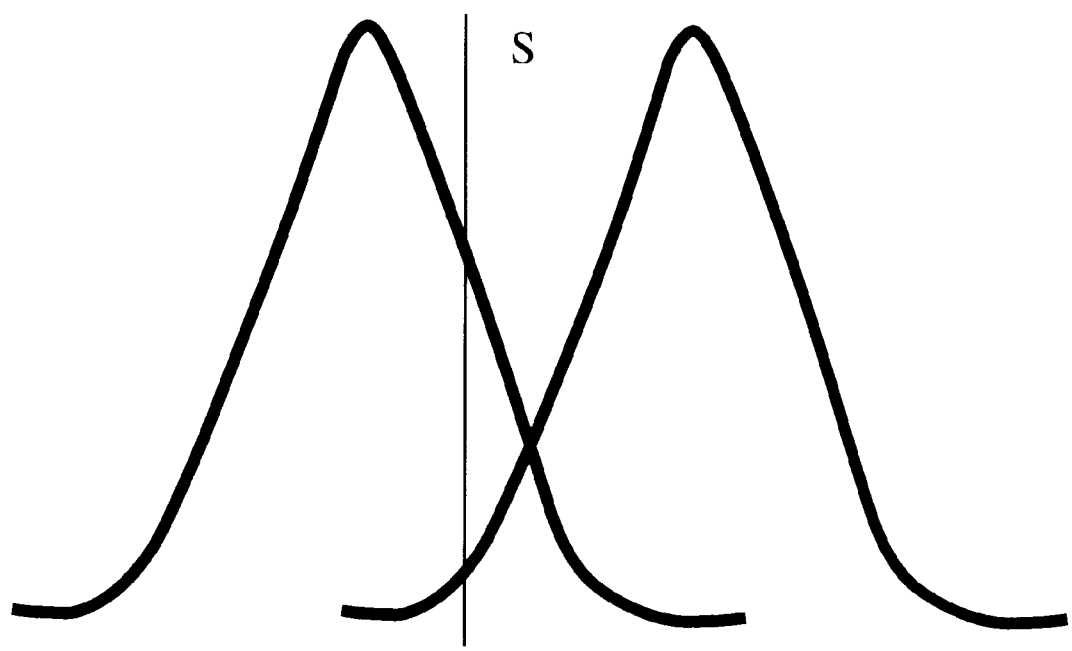
FIG. 1 is a graph showing a Gaussian distribution of capture-rate and false-alarm-rate.
Figure 2:
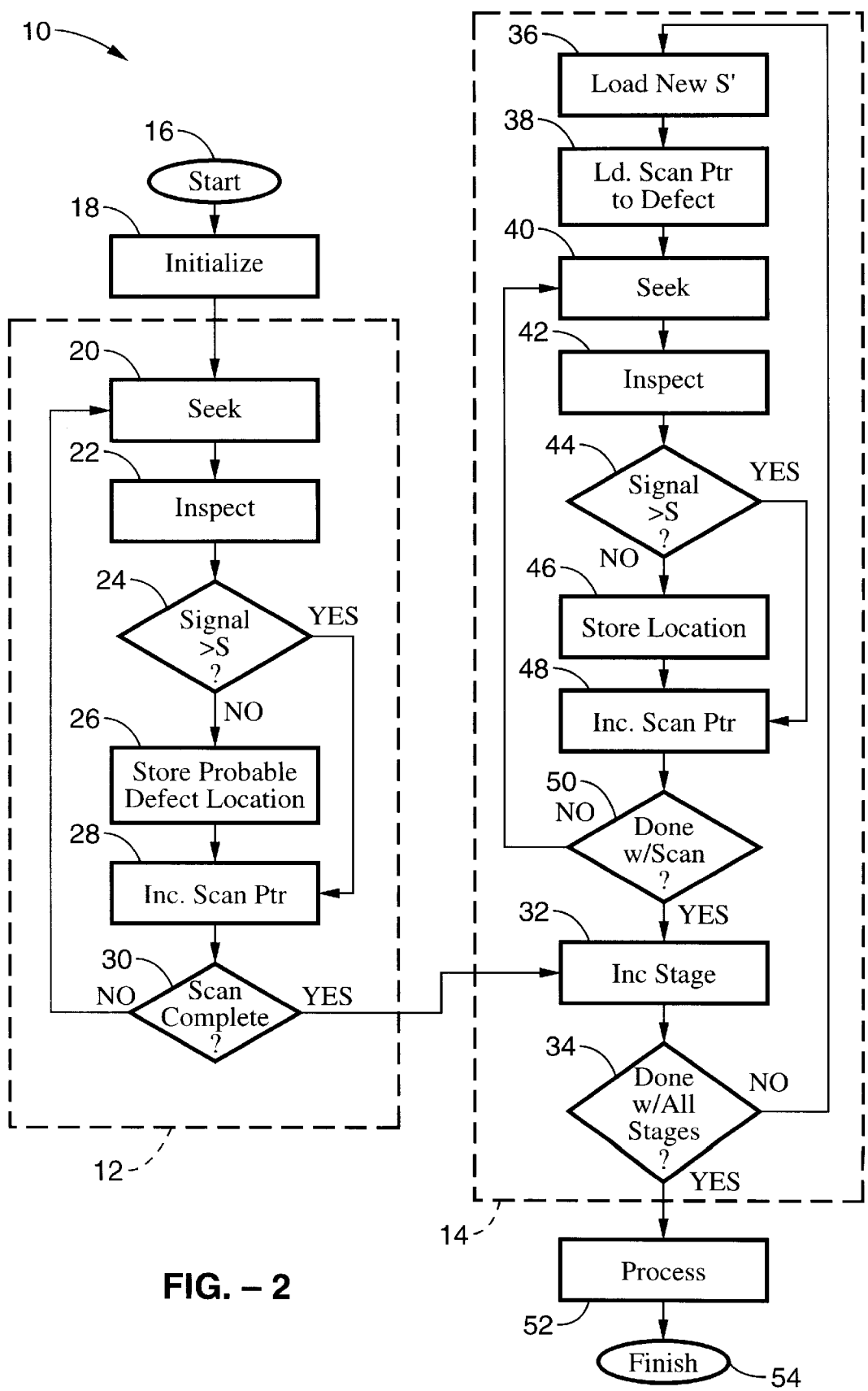
FIG. 2 is a flowchart of a multiple stage defect inspection method according to the invention.

Referring more specifically to the drawings for illustrative purposes, the present invention is embodied in the method generally shown in the flowchart of FIG. 2. It will be appreciated that the method may be used with a variety of hardware and for various inspection situations, and that the details of the steps may vary somewhat without departing from the basic concepts as disclosed herein.

The inspection process 10 shown in FIG. 2 contains a first stage scan loop 12 and a second "through n" stage scan loop 14. For clarity the flowchart of FIG. 2 represents steps of the method as if performed by a software driven program; however it must be understood that similar processing according to the inventive method can be implemented using a variety of conventional means and devices.

As can be seen, the scanning process starts at entry point 16 Next, the system is initialized for inspecting a new mask blank at step 18. The first stage scan 12 starts with a seek to a location at step 20 which is then inspected by taking a measurement at step 22. The measured reflected bright field signal is compared with the threshold value s at step 24 The threshold value s is preferably set to allow a false-alarm-rate which is higher than that required when the inspection process has been completed.

If the amount of reflected signal is above the threshold, then the pixel at the inspected location is considered good. A scan pointer is then advanced at step 28. Otherwise, when the inspection of a pixel detects a pixel whose signal is below the threshold value s, then the location of this probable defect is saved at step 26 for subsequent stages of inspection before proceeding to step 28. A scan completion check is then made as step 30 and, if the check shows that the scan is not yet complete, a seek to the next pixel is performed at step 20 and the first stage loop continues scanning. Upon satisfying the scan completion check at step 30, the entire mask blank has been inspected once at the threshold value s, and processing of the mask blank proceeds into a second stage 14 of scanning.

As the second stage of scanning is entered, a stage counter is incremented at step 32, and a completion check at step 34 allows this uncompleted scan to proceed by loading a new threshold value at step 36, as S' (where S'<S), for the inspection scan. The location (e.g., a pointer) of a probable defect, as detected in an earlier stage, is loaded as a new seek location at step 38 and a seek to the location performed at step 40. At step 42, the pixel is inspected by comparing the measured response to the new threshold S'. If the location is found to be a defect by failing the comparison, then the location is stored for later retrieval at step 46. The scan pointer can then be loaded at step 48 with the location of the next probable defect, and unless the scan completion check has been satisfied at step 50, a seek to the next probable defect is performed at step 40. If the scan is completed, then the inspection stage counter increments at step 32. If only two stages of multi-stage processing are being performed, then the "all stage" completion check is satisfied at step 34 and the results of the multi-stage scanning are processed at step 52. The inspection process for this mask blank is then complete, and exited at exit point 54.

EXAMPLE 1

The multi-level inspection method described above can reduce the number of pixels which are inspected at the low false-alarm threshold settings, and can therefore produce a throughput increase under certain circumstances. To properly compare this multi-level inspection method with a single-level inspection strategy, the problem is constrained so that the final capture-rate is 90%, and the final false-alarm-rate is less than 1 count/cm². The scanning overhead, as measured in units of time, for the pixels inspected in the first stage are classified in two categories. One is the time required to move the probe head to a desired location (seek_time). While a second is the positional uncertainly of the probe head which requires overlapped inspection areas (area_factor). Considering these factors the final scanning time, capture-rate, and false-alarm-rate can be expressed as:

$$T/A = \frac{Np}{F_0 \times \sigma_1^2} + Np \times fa(s_1, \sigma_1) \times \left(\frac{\text{seek\_time} + \text{area\_factor}}{F_0 \times \sigma_2^2}\right) \quad (11)$$

$$\text{capture\_rate} = ca(s_1, \sigma_1) \times ca(s_2, \sigma_2) \geq (\text{ultimate\_capture\_rate}) \quad (12)$$

$$\text{false\_alarm\_rate} = \text{area\_factor} \times fa(s_1, \sigma_1) \times fa(s_2, \sigma_2) < 1/Np \quad (13)$$

In the expressions above, $s_1$, $\sigma_1$, are the threshold value and standard deviation, respectively, of the first level inspection, and $s_2$, $\sigma_2$, are the corresponding quantities for the second level inspection. The final false-alarm-rate is multiplied by the area-factor since the number of pixels classified as defects in the first stage is given by:

$$Np \times fa(s_1, \sigma_1) \quad (14)$$

In the next stage of inspection, the number of pixels that need to be scanned is given by:

$$Np \times fa(s_1, \sigma_1) \times \text{area\_factor} \quad (15)$$

The probability of a pixel being classified as a defect in the second stage is $fa(s_2, \sigma_2)$, therefore the final number of pixels to be classified as defects is:

$$Np \times \text{area\_factor} \times fa(s_1, \sigma_1) \times fa(s_2, \sigma_2) < 1 \quad (16)$$

This number needs to be less than unity, which is the maximum number of false counts allowed per cm².

When the seek time from pixel to pixel of the inspection is negligible, compared with the time of inspection per pixel, solving the problem is simple. For a given first-level set of inspection parameters $s_1$, $\sigma_1$, the set of values $s_2$, $\sigma_2$, which minimize the scan time is chosen to maximize $\sigma_2$. For a given set of first level inspection parameters $s_1$, $\sigma_1$, the capture-rate and the false-alarm-rate of the first stage are uniquely determined. Once the false-alarm-rate and the capture-rate of the first stage are determined, the minimum capture-rate and maximum false-alarm-rate of the second stage are also uniquely determined. The maximum value for $\sigma_2$, ($\sigma_2$ determines the time it takes for the second level scanning) is achieved when the false-alarm-rate of the second stage is equal to the maximum false-alarm-rate and the capture-rate of the second stage is equal to the minimum capture-rate is described as follows.

For a given capture-rate and false-alarm-rate, the threshold value s, and the standard deviation σ can be uniquely determined as long as the capture-rate exceeds the false-alarm-rate. The condition is based on the fact that there is one unique value as given by the following, which satisfies the given capture-rate (α):

$$\text{unique\_capture\_rate\_value}(\alpha) = \frac{(s - 0.99)}{\sqrt{2} \times \sigma} \quad (17)$$

Another unique value given by the following satisfies the specified false-alarm-rate ($\beta$).

$$\text{unique\_false\_alarm\_rate\_value}(\beta) = \frac{(s - 1.0)}{\sqrt{2} \times \sigma} \quad (18)$$

Therefore the relationships can be expressed as:

$$\frac{(s - 0.99)}{\sqrt{2} \times \sigma} = \alpha \text{ such that capture\_rate} = \frac{(1 + erf(\alpha))}{2} \quad (19)$$

$$\frac{(s - 1.0)}{\sqrt{2} \times \sigma} = \beta \text{ such that false\_alarm\_rate} = \frac{(1 + erf(\beta))}{2} \quad (20)$$

$$s = \frac{(1.0 + 0.01\beta)}{(\alpha - \beta)} \quad \text{and} \quad \sigma = \frac{0.01}{\left(\sqrt{2} / (\alpha - \beta)\right)} \quad (21)$$

Where inverf is the inverse of the error function, the values of $\alpha$ and $\beta$ can be determined by:

$$\alpha = \text{inverf}(\text{capture\_rate} - 1) \quad (22)$$

and $$\beta = \text{inverf}(2 \times \text{false\_alarm\_rate} - 1) \quad (23)$$

It can be seen therefore, that value combinations of $s_1$, $\sigma_1$, can be found which minimize the total scan time. These optimum combinations of scanning parameters depend on the magnitude of area uncertainty. When the area of uncertainty is very large, the first level scanning needs to have smaller false-alarm-rate, so as not to offset the savings the first level scanning time with the overhead of the neighboring pixels.

EXAMPLE 2

As an example, assume the area factor is 100, then it is necessary to scan 100 extra pixels around each detected defect pixel which passed-through the first level inspection into the second level of inspection. To achieve a capture-rate of 90%, the single-level scanning time is 1697 seconds with $\sigma = 0.145\%$ and $s_1 = 0.9919$. Using a two stage inspection, with area uncertainty factor of 100, results in an achieved optimum scanning time when the first stage false-alarm-rate is 2.3e-4. In contrast, when the area factor is equal to 1, the optimum scanning time is achieved when the false-alarm-rate is 0.0766.

Figure 3:
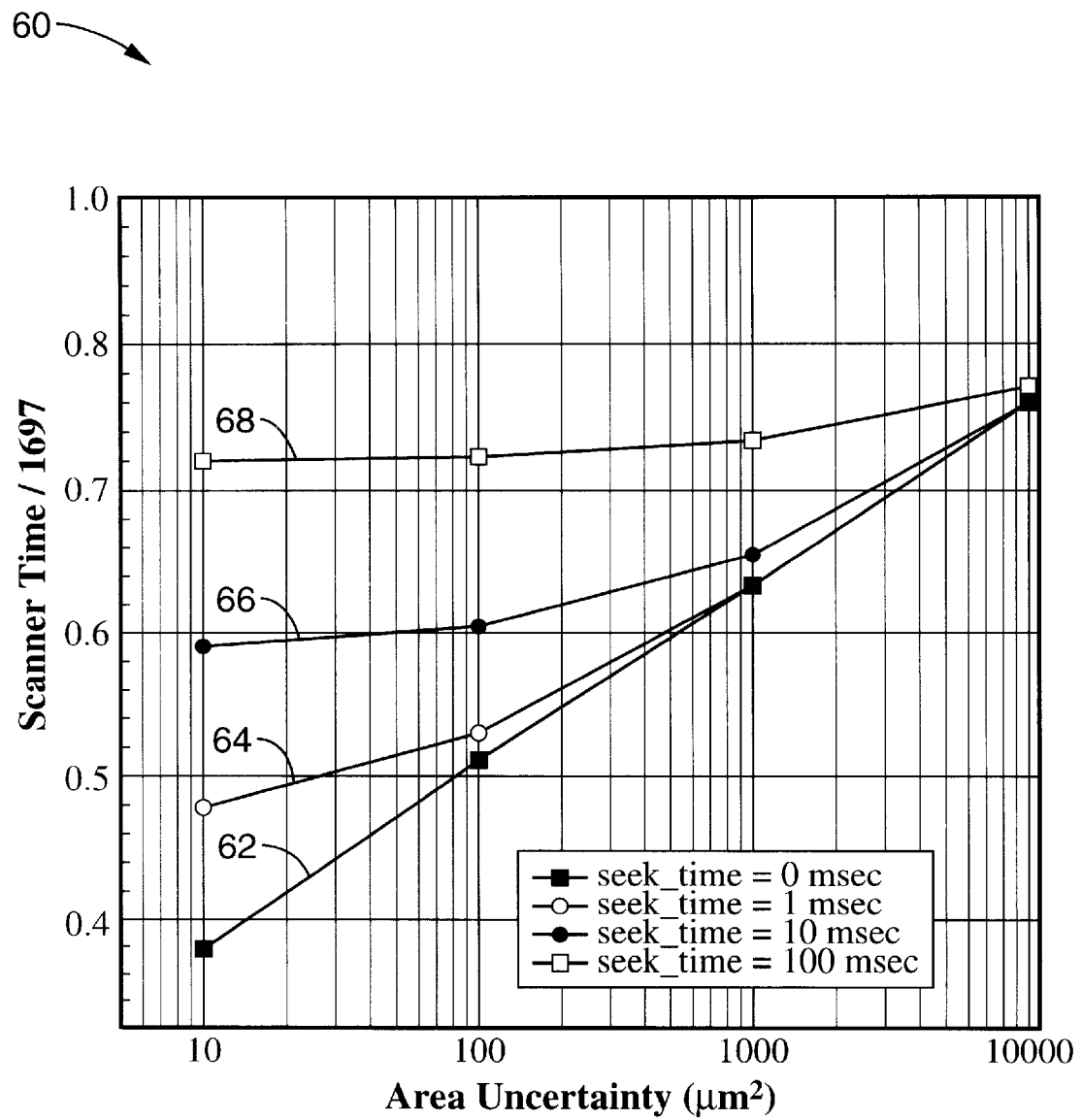
FIG. 3 is a graph of resultant scan times determined for a range of seek times.

FIG. 3 is a graph 60 of scan times normalized to a single level scan. Line 62 depicts results for 0 msec seek times, line 64 depicts results for 1 msec seek times, line 66 depicts results for 10 msec seek times, and line 68 depicts results for 100 msec seek times. The resultant savings in scanning time for a negligible overhead (0 msec seek time, area uncertainty of 10) can be seen on the graph as 62%. This is the time required in comparison with a single scanning inspection system which would be shown on this normalized graph as a horizontal line at 1.0. As can be seen on the graph, the total scanning time increases, as expected, with increasing area uncertainty. When the seek time is finite, then the requisite balance shifts towards using lower false-alarm-rates in the first stage, this shift also occurs with larger areas of uncertainty. With excessive false-alarm counts in the first stage, the added seek time can offset any savings in scan time gained by multiple-level scanning. A lowered false-alarm-rate forces an increase in first stage scanning compared to that with negligible seek time. The added overhead of seek time increases effects both the first stage scan and any subsequent stage of scanning. The graph depicts optimum inspection scan times achieved with levels of finite seek time and finite area factor. The graph also shows that we can reduce the scan time by as much as three-fold by performing a two-level scan when the seek time overhead and area of uncertainty are negligible.

Accordingly, it will be seen that this multi-level scanning method for defect inspection can provide numerous advantages, most notably improved inspection throughput. The method has been described in reference to the scanning of EUVL blank masks, however the method is applicable to a variety of inspection tasks wherein the relationships of scan time and area uncertainty are favorable to this multi-stage process.

Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A defect inspection method, comprising the steps of:
   (a) performing a first stage inspection of a surface of an object using a first defect identification threshold;
   (b) using said first stage inspection, identifying a plurality of first defect areas on said object;
   (c) performing a second stage inspection of said first defect areas using a second defect identification threshold that provides a reduced level of false alarms as compared with the first defect identification threshold; and
   (d) using said second stage inspection, identifying a plurality of second defect areas as a subset of the first defect areas.

2. A method as recited in claim 1, wherein each of said defect thresholds are calculated to provide a given signal-to-noise ratio for the inspection that corresponds to a specific maximum false-alarm ratio.

3. A method as recited in claim 1, wherein said object comprises a mask blank to be inspected.

4. A method as recited in claim 3, wherein said mask blank comprises an Extreme UltraViolet Lithography mask blank.

5. A method as recited in claim 1, wherein said defect identification thresholds are determined based upon seek times and area uncertainty of a scanning inspection system.

6. A defect inspection method, comprising the steps of:
   inspecting a surface of an object for defects using a defect identification threshold and identifying a defect region on said object;
   inspecting said defect region using a lower defect identification threshold and identifying a new defect region that is smaller in size than the previously identified defect region; and
   successively inspecting each subsequently identified defect region using a lower defect identification threshold than the previous defect identification threshold until a final defect identification threshold is reached.

7. A method as recited in claim 6, wherein a two stage inspection is performed by setting said defect inspection threshold to said final defect identification threshold.

8. A method as recited in claim 6, wherein said object comprises a mask blank to be inspected.

9. A method as recited in claim 8, wherein the mask blank comprises an Extreme UltraViolet Lithography mask blank.

10. A method as recited in claim 6, wherein said defect identification thresholds are determined based upon seek times and area uncertainty of a scanning inspection system.

11. A method for inspecting a first area of a surface of an object for defects by scanning said first area, said first area comprising a plurality of second areas, said method comprising the steps of:

(a) measuring a characteristic from each of said second areas, comparing each said measured characteristic against a threshold value X during the scan, and saving location information for each failed comparison and designating the location as a probable defect;

(b) altering the threshold value X to a value closer to a final threshold which characterizes a final stage of inspection;

(c) measuring a characteristic of each probable defect location, comparing each said measured characteristic against the altered threshold value X from step (b), and saving location information for each of said second areas which still fails the comparison;

(d) designating probable defects as actual defects when the threshold value X is set to a value equal to the final threshold value; and (e) returning to step (b) to perform another inspection stage if the threshold value X is not set to a value equal to the final threshold value.

12. A method as recited in claim 11, wherein a two stage inspection is performed by setting said threshold value X to the final threshold value upon a first entry and singular entry to step (b).

13. A method as recited in claim 11, wherein said first area is contained upon a mask blank to be inspected.

14. A method as recited in claim 13, wherein said mask blank comprises an Extreme UltraViolet Lithography mask blank.

15. A method as recited in claim 11, wherein said threshold values are computed based upon seek times and area uncertainty of a scanning inspection system.

\* \* \* \* \*